(12) United States Patent
Bronstein et al.

(10) Patent No.: US 8,607,782 B2
(45) Date of Patent: Dec. 17, 2013

(54) STRETCHED MEMBRANE SOLAR COLLECTOR WITH BEARING EDGE

(76) Inventors: Allen I Bronstein, Inverness, CA (US); Howard Harrenstien, Miami, FL (US)

(*) Notice: Subject to any disclaimer, the term of this patent is extended or adjusted under 35 U.S.C. 154(b) by 791 days.

(21) Appl. No.: 12/353,044

(22) Filed: Jan. 13, 2009

(65) Prior Publication Data
US 2009/0178669 A1    Jul. 16, 2009

Related U.S. Application Data

(60) Provisional application No. 61/020,933, filed on Jan. 14, 2008.

(51) Int. Cl.
*F24J 2/08*    (2006.01)
*F24J 2/10*    (2006.01)

(52) U.S. Cl.
USPC ............................................. 126/684

(58) Field of Classification Search
USPC ............................ 359/847, 848; 126/684, 690
See application file for complete search history.

(56) References Cited

U.S. PATENT DOCUMENTS

| | | | |
|---|---|---|---|
| 4,127,926 A | | 12/1978 | White |
| 4,293,192 A | * | 10/1981 | Bronstein .................... 359/846 |
| 4,493,313 A | | 1/1985 | Eaton |
| 5,071,243 A | * | 12/1991 | Bronstein .................... 359/867 |
| 6,113,242 A | * | 9/2000 | Marker et al. ................ 359/847 |
| 6,332,687 B1 | | 12/2001 | Carreras et al. |
| 6,945,659 B2 | | 9/2005 | Creek |
| 2004/0055594 A1 | | 3/2004 | Hochberg et al. |
| 2008/0247069 A1 | * | 10/2008 | Bronstein .................... 359/871 |

* cited by examiner

*Primary Examiner* — Alessandro Amari
(74) *Attorney, Agent, or Firm* — Jill L. Robinson

(57) ABSTRACT

An improved solar reflector utilizing tensioned reflective membrane, where a bearing edge device is employed to smooth wrinkles in the membrane and limit distortion.

8 Claims, 3 Drawing Sheets

STRETCHED MEMBRANE SOLAR COLLECTOR WITH BEARING EDGE

CROSS-REFERENCE TO RELATED APPLICATIONS

This invention is a continuation-in-part of provisional patent application 61/020,933, which is incorporated by reference herein.

BACKGROUND OF THE INVENTION

The invention relates to a new method of design and construction of linear tensioned membrane solar reflectors for solar parabolic trough concentrators, solar linear reflectors, and linear heliostats for solar Fresnel reflecting systems, in particular those that utilize thin flexible films for the membrane substrate.

Linear tensioned membrane reflectors have many advantages over more traditional designs incorporating ridged frame structures. They are relatively light and easy to assemble. In part because of the lightweight, multiple reflectors can be mounted on a single frame structure which can be balanced on a single pillow block bearing allowing for tilting adjustments to be made with minimal energy expended.

Trough-shaped linear tensioned membrane reflectors, such as those shown in U.S. Pat. No. 4,293,192, issued Oct. 6, 1981, to Allen I. Bronstein and U.S. Pat. No. 4,510,923, issued Apr. 16, 1985 to Allen I. Bronstein, usually comprises a frame structure with parallel-facing identical end form members, each describing the desired cross-sectional shape of the reflector. A membrane of highly reflecting material, such as metalized reflective plastic film, is wrapped tightly around the edges of the form members and the membrane. The membrane is then placed under 1000 to 7000 pounds per square inch (PSI) of tension in one direction, usually by moving one of the end form members away from the other.

However, linear tensioned membrane reflector technology presents certain problems that do not exist for linear solar reflector technologies constructed with a rigid structural frame, especially when the device utilizes certain materials or laminates, such as plastic films, as the membrane's substrate. For example, Mylar (Biaxially-oriented polyethylene terephthalate boPET polyester film) is a dimensionally stable material that reacts in undesirable ways when the film is placed under compression. A typical means of mounting the membrane is to adhere it to the underside of a metal strap with a structural adhesive, such as epoxy. The strap is then wrapped around the end form and clamped in place. However, as the strap is bent around the end form, the strap's inward facing surface and the membrane are placed in compression, wrinkles are produced; they are then crushed and locked in place as the strap is tightened on the end form. These distortions in the film are magnified by the film and transmitted into the membrane as large longitudinal wrinkles and ripples that span across the entire membrane's surface, distorting its shape.

It is an objective of this invention to reduce the wrinkles and other shape distortions that may occur when thin films are used as a membrane substrate in tensioned membrane solar reflectors.

BRIEF SUMMARY OF THE INVENTION

The present invention overcomes the problems of distortion described above, thus improving performance of the reflector. When a bearing edge having the desired cross-sectional shape of the reflector is pressed down into a wrinkled membrane, the bearing edge stretches and tensions the film and smoothes out its surface, thereby eliminating the spread of wrinkles into the membrane. The bearing edge can also be used to compensate for any change in the membrane's dimensions and corresponding changes in the membrane's optical cross-sectional shape when under tension. The downward force required by the bearing edge to tension the film and overcome the wrinkles is not great and does not add significant tension force; therefore it does not jeopardize the structural integrity of the membrane. Preferably, the bearing edge is positioned near the end forms of the reflector so as to correct the shape of the membrane and remove as many of the wrinkles as possible.

BRIEF DESCRIPTION OF THE SEVERAL VIEWS OF DRAWINGS

DETAILED DESCRIPTION OF THE INVENTION

Figure 1:
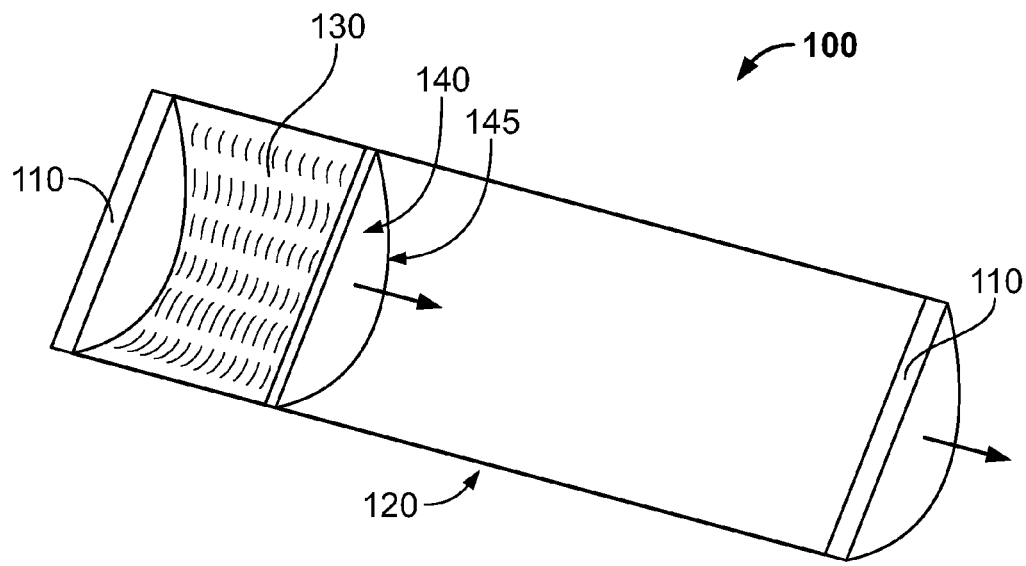
FIG. 1 shows a conceptual, perspective view of a tensioned solar reflector of a trough design, utilizing a bearing edge plate.

With reference to FIG. 1, the invention is shown in concept. A tensioned solar reflector of a trough design 100 includes end forms 110 of appropriate shape, for example, parabolic. A reflective membrane 120, which may include a thin plastic film or other laminate as the substrate, is attached to the end forms 110 by any of a number of conventional means. It will be understood that although not shown in this figure for simplicity, in an operational device an energy collector would normally run longitudinally along the trough at the reflective focal point. The end forms 110 are positioned to place a longitudinal tension force on the membrane. In practice, this is often accomplished by having one of the end forms held in a stationary position and moving the other end form away until the desired tension is reached, although other methods of creating this force, for example, two moving end forms or stretching the membrane over two stationary end forms, are possible.

It will be noted that as a result of the attachment of the membrane 120 to the end forms 110, wrinkles 130 may develop in the membrane. The bearing edge plate 140 can be pressed into the membrane 120, whereby the bearing edge 145 stretches and tensions the film, smoothing out its surface, and thereby eliminating the wrinkles. The downward force required by the bearing edge plate to tension the film and overcome the wrinkles is not great. The force does not need to be great, and should not add significant tension force to the membrane so as not to jeopardize the membrane's structural integrity. Generally, in a standard trough design, at least two bearing edges would be used, one near each of the end plates; however, the principle would also allow for designs with only one or with more than two bearing edges.

Further, with appropriate selection of the bearing edge 145 shape, the bearing edge plate 140 can also be used to compensate for any change in the membrane's dimensions and corresponding changes in the membrane's optical cross-sectional shape when under tension, allowing for optimization of device performance. A technique of selecting the correct end form edge shape to compensate for such changes is disclosed in U.S. patent application Ser. No. 12/062,410 and PCT/US08/59325, which are incorporated herein by reference, but a similar technique could be employed to determine the correct bearing edge shape.

Preferably, the bearing edge is positioned near the end forms of the reflector so as to allow for correction of the shape of the membrane and remove as many of the wrinkles as possible.

Figure 2:
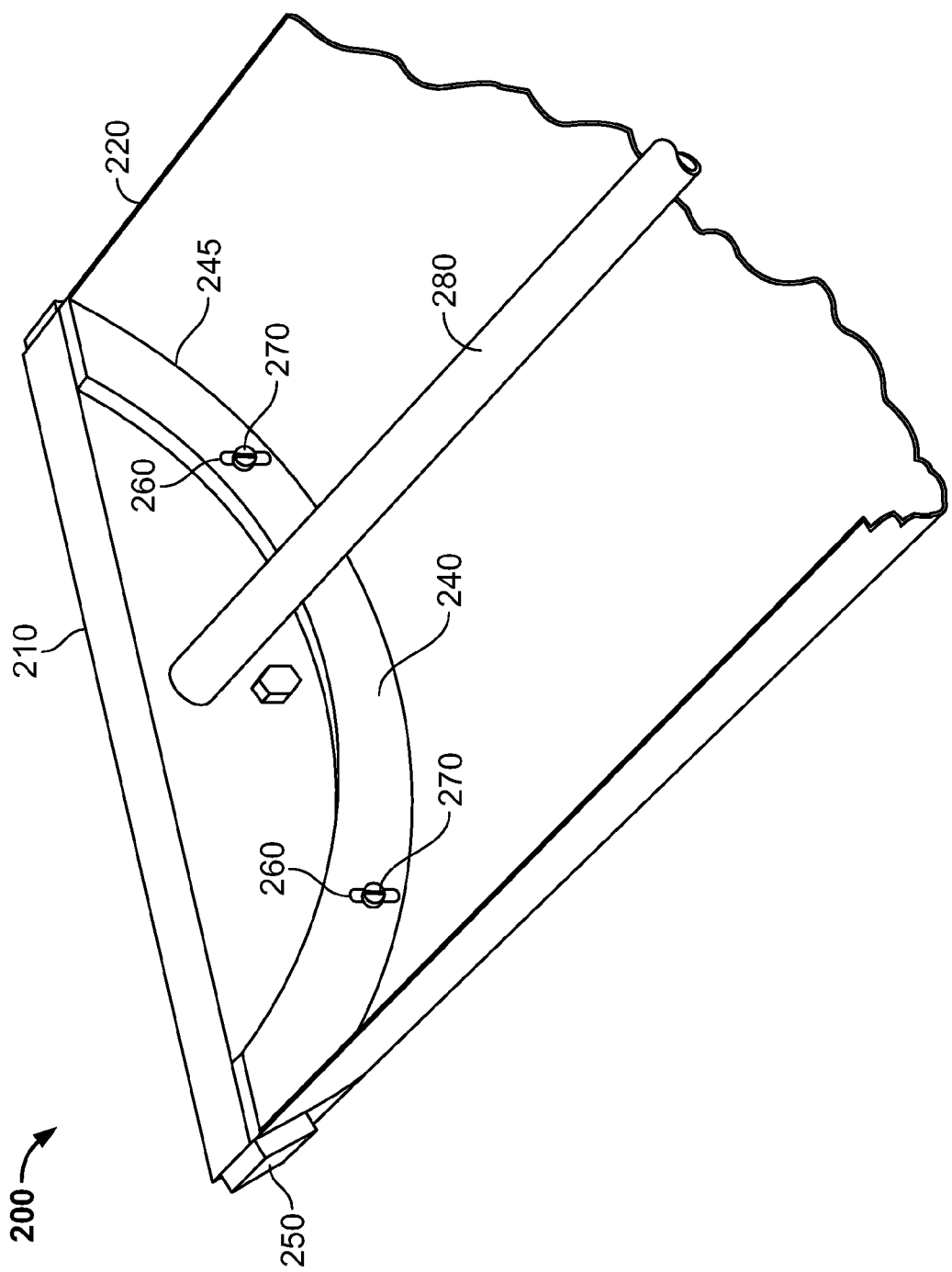
FIG. 2 shows a perspective view of a tensioned solar reflector including a practical embodiment of the invention as a bearing edge plate.

In practice, the bearing edge may be attached or incorporated into the reflector design in a variety of ways. FIG. 2 shows an embodiment of the invention in use in a tensioned solar reflector of trough design 200 where an arched shaped sheet metal bearing edge plate 240 is attached to end form 210 by slots 260 and adjusting screws 270. The bearing edge plate's position, and thus the position of the bearing edge 245 itself, can be adjusted by loosening the adjusting screws 270 and sliding the plate 240 downward in the slots until the bearing edge 245 presses down into the membrane 220 to the degree necessary to stretch out the wrinkles and/or adjust the optical cross-sectional shape of the membrane 220. The adjusting screws 270 are then tightened, holding the bearing edge plate 240 in place. The screw and slot attachment allows the bearing edge plate to be accurately located on the end form, thereby maintaining the correct geometric relationship between the bearing edge 245, the membrane 220 and the receiver pipe 280.

Figure 4:
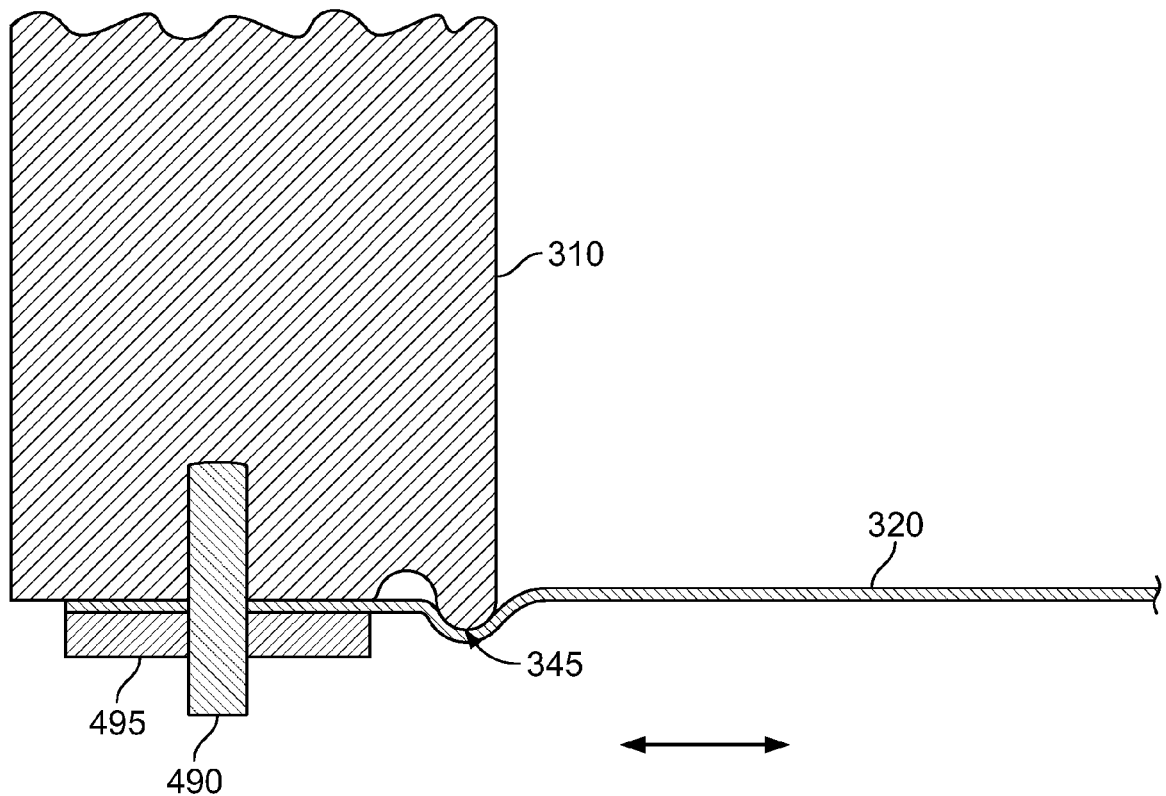
FIG. 4 shows a cross-sectional view of the invention integrated into the end plate of the reflector.
Figure 3:
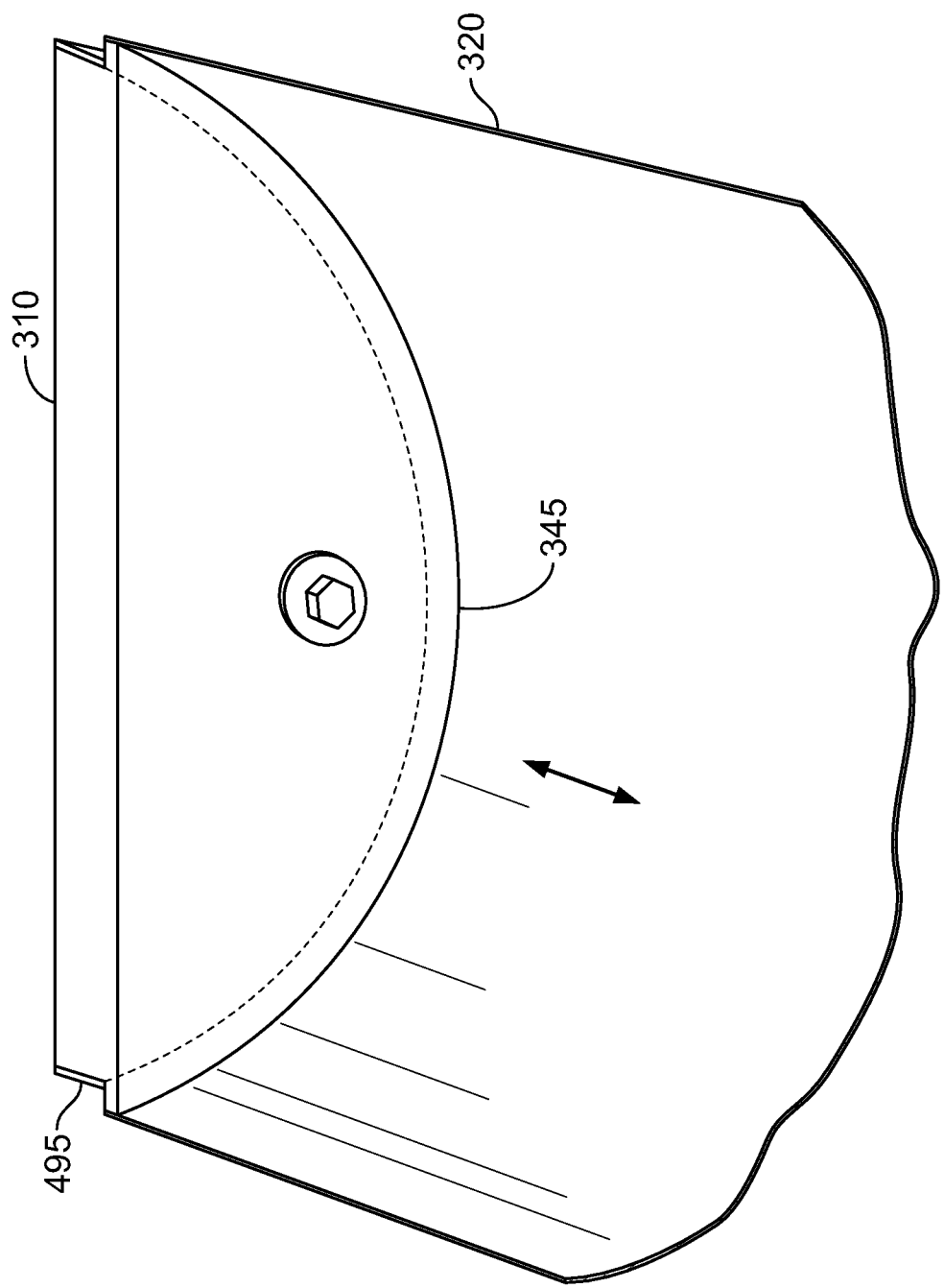
FIG. 3 shows a perspective view of a tensioned solar reflector which includes the invention integrated into the end plate of the reflector.

FIGS. 3 and 4 show another embodiment of the invention in which the bearing edge 345 is incorporated into the periphery of the end form 310, eliminating the need for a separate bearing edge plate. In the reflector shown, a conventional means is used to attach the membrane to the end form: the membrane 320 is adhered to the underside of a metal strap 495 with a structural adhesive, such as epoxy. The strap 495 is then wrapped around the end form 310 and clamped in place. An alignment pin 490 can be used to position the strap 495. However, as noted above, as the strap 495 is bent around the end form 310 the strap's inward facing surface and the membrane are placed in compression which can produce wrinkles. The wrinkles are then crushed and locked in place as the strap 495 is tightened on the end form 310. Without correction, these distortions in the film would be magnified by the film and transmitted into the membrane as large longitudinal wrinkles and ripples that span across the entire membrane's surface, distorting its shape. However, the bearing edge 345 is incorporated into the end form 310 as an integrated "lip", which tensions the membrane 320, smoothing out wrinkles and guides the membrane to its correct optical position. In this manner any optical cross-sectional deviations caused by the membrane being in compression under the strap and being longitudinally tensioned can be corrected.

While the present invention has been shown and described with reference to the foregoing preferred embodiments, it will be apparent to those skilled in the art that changes in form, connection, and detail may be made therein without departing from the spirit and scope of the invention as defined in the appended claims.

We claim:

1. A solar reflector comprising:
   a support structure;
   a first end form member attached to said support structure having a first periphery and a second form member attached substantially parallel to the first form member having a second periphery;
   a tensioned membrane having a reflective surface, said tensioned membrane having a first edge and a second edge opposite the first edge, wherein the first edge is attached to the first periphery and the second edge is attached to the second periphery;
   a first bearing edge comprising a first bearing edge plate pressed into the membrane.

2. The solar reflector of claim 1 wherein the first bearing edge plate is attached to and supported by the first end form member.

3. The solar reflector of claim 1 wherein the first bearing edge is positioned close to the first end form member.

4. The solar reflector of claim 1 further comprising a second bearing edge pressed into the membrane.

5. The solar reflector of claim 4 wherein the first bearing edge is positioned close to the first end form member and the second bearing edge is positioned close to the second end form member.

6. The solar reflector of claim 1 further comprising a second bearing edge pressed into the membrane and a second bearing edge plate which
   comprises the second bearing edge wherein the second bearing edge plate is attached to and supported by the second end form member.

7. A solar reflector comprising:
   a support structure;
   a first end form member attached to said support structure having a first periphery and a second form member attached substantially parallel to the first form member having a second periphery;
   a tensioned membrane having a reflective surface, said tensioned membrane having a first edge and a second edge opposite the first edge, wherein the first edge is attached to the first periphery and the second edge is attached to the second periphery;
   a first bearing edge pressed into the membrane wherein the first end form member comprises the first bearing edge, and the first bearing edge comprises a lip-like structure and is integrally formed with the first periphery.

8. The solar reflector of claim 7 further comprising a second bearing edge pressed into the membrane, wherein the second end form member comprises the second bearing edge and the second bearing edge is integrally formed with the second periphery.

* * * * *